US008911349B2

(12) United States Patent  (10) Patent No.: US 8,911,349 B2
Jackson  (45) Date of Patent: Dec. 16, 2014

(54) INTERCHANGEABLE ATTACHMENT CONNECTOR SYSTEMS

(76) Inventor: Todd William Jackson, London (CA)

(*) Notice: Subject to any disclaimer, the term of this patent is extended or adjusted under 35 U.S.C. 154(b) by 664 days.

(21) Appl. No.: 13/143,456

(22) PCT Filed: Jan. 8, 2010

(86) PCT No.: PCT/CA2010/000016
§ 371 (c)(1),
(2), (4) Date: Jul. 6, 2011

(87) PCT Pub. No.: WO2010/078655
PCT Pub. Date: Jul. 15, 2010

(65) Prior Publication Data
US 2011/0270033 A1   Nov. 3, 2011

Related U.S. Application Data

(60) Provisional application No. 61/204,636, filed on Jan. 9, 2009.

(51) Int. Cl.
A61F 5/00 (2006.01)
F16B 35/04 (2006.01)
A61H 19/00 (2006.01)
F16B 33/00 (2006.01)
F16B 15/06 (2006.01)
F16B 33/02 (2006.01)
F16B 5/06 (2006.01)

(52) U.S. Cl.
CPC ............ *F16B 33/006* (2013.01); *F16B 35/041* (2013.01); *A61H 19/00* (2013.01); *A61H 19/30* (2013.01); *F16B 15/06* (2013.01); *F16B 2005/0671* (2013.01); *A61H 2201/1685* (2013.01); *A61H 2201/0153* (2013.01); *A61H 19/40* (2013.01); *F16B 33/02* (2013.01)
USPC ........................................................ 600/38

(58) Field of Classification Search
USPC .................................................... 600/38–41
See application file for complete search history.

(56) References Cited

U.S. PATENT DOCUMENTS

| 4,989,592 | A  | * | 2/1991  | Chang ............................ 600/38 |
| 5,127,396 | A  |   | 7/1992  | McAllister |
| 5,853,362 | A  | * | 12/1998 | Jacobs ........................... 600/38 |
| 6,132,366 | A  | * | 10/2000 | Ritchie et al. ................. 600/38 |
| 6,547,717 | B1 | * | 4/2003  | Green et al. ................... 600/38 |
| 2007/0106110 | A1 | * | 5/2007  | Hollingsworth et al. ....... 600/38 |
| 2009/0234182 | A1 | * | 9/2009  | Buchholz ....................... 600/38 |
| 2011/0009691 | A1 | * | 1/2011  | Stevens ......................... 600/38 |

FOREIGN PATENT DOCUMENTS

WO   WO 2009/003243   *   1/2009

* cited by examiner

*Primary Examiner* — John Lacyk
(74) *Attorney, Agent, or Firm* — Eduardo Krupnik; Miller Thomson LLP

(57) ABSTRACT

The present invention relates to an interchangeable attachment connector system, characterized in that said system comprises: (a) a connector member, wherein said connector member comprises a shaft, said shaft having an engagement end and a distal end, wherein at least a portion of the shaft includes male threads; and (b) an interchangeable attachment capable of being removably engaged to the shaft of the connector member, the interchangeable attachment comprising a body, wherein said body includes two axial ends, an entry opening located in one of said axial ends and an axial bore extending from the entry opening, wherein said bore includes an entry opening and internal walls having female threads complementary to the male threads on the shaft of the connector member, wherein the shaft and the interchangeable attachment can be pushed together for engagement by inserting the engagement end of the shaft through the entry opening, and wherein engagement between the male threads and the female threads on the shaft and the interchangeable attachment prevent relative longitudinal pull-out motion between the engaged shaft of the connector member and interchangeable attachment while allowing relative rotational motion for disengagement of the interchangeable attachment from the shaft of the connector member. In aspects of the invention the interchangeable attachment comprises an interchangeable sexual aid device.

28 Claims, 6 Drawing Sheets

__US 8,911,349 B2__

INTERCHANGEABLE ATTACHMENT CONNECTOR SYSTEMS

CROSS REFERENCE TO RELATED APPLICATIONS

This application is a national stage application under 35 U.S.C. 371 of International Application No. PCT/CA2010/000016, filed Jan. 8, 2010, which in turn claims the benefit under 35 U.S.C. 119(e) of U.S. Provisional Application Ser. No. 61/204,636, filed Jan. 9,/2009, the contents of each of which is hereby incorporated by reference into the present disclosure.

FIELD OF THE INVENTION

The present invention relates to interchangeable attachment connector systems, connectors and interchangeable attachments. More specifically, the present invention relates to interchangeable attachment connector systems for attaching a diversity of sexual devices.

BACKGROUND OF THE INVENTION

With the onslaught of venereal diseases such as herpes and AIDS, sexual aids, sexual devices and sex toys are used as part of safe sex practices. Sex aids/toys may also be used by couples when the male partner is impotent. And, sex aids and paraphernalia, such as phalluses, dildos, have been used by sex counsellors as part of the tools used to counsel their patients.

In this document, the term sexual aid/sex toy is used as a catch-all term for any device used for sexual stimulation. Examples of sexual aids include, without limitation, anal beads, butt plugs, clitoral stimulators, anal stimulators, dildos (including double dildos), massager, masturbator, penis sleeve, strap-on (dildo or vibrator which is attached via a harness), vibrators, vaginal toys and anal toys.

One problem facing users of sexual aids is interchangeability and versatility of sex toys.

U.S. Pat. No. 5,127,396 (US '396) addresses the problem of versatility and interchangeability. US '396 discloses a phallus or other device formed of substantially resilient material in combination with a plug formed of a substantially rigid material. The phallus or other device has a hollow shaped hole in its back which corresponds in shape to the shape of the plug, but has slightly smaller dimensions. In use the plug is forced into the device's hollow back. Air is forced out of the hollow and a vacuum-like fit is achieved between the device and the plug. However, there are many disadvantages of the device of US '396: the plug does not have surface area to securely hold the phallus, removal of the phallus is difficult and can damage the phallus, and the device does not provide the ability to sandwich other devices between the phallus and the plug.

What is needed is a device that allows a user to interchange different sexual accessories available in the industry with ease and without danger of slipping out, and/or damage to the toy.

SUMMARY OF THE INVENTION

In one aspect, the present invention provides for an interchangeable attachment connector system, characterized in that said system comprises: (a) a connector member, wherein said connector member comprises a shaft, said shaft having an engagement end and a distal end, wherein at least a portion of the shaft includes male threads; and (b) an interchangeable attachment capable of being removably engaged to the shaft of the connector member, the interchangeable attachment comprising a body, wherein said body includes two axial ends, an entry opening located in one of said axial ends and an axial bore extending from the entry opening, wherein said bore includes internal walls having female threads complementary to the male threads on the shaft of the connector member, wherein the shaft and the interchangeable attachment can be pushed together for engagement by inserting the engagement end of the shaft through the entry opening, and wherein engagement between the male threads and the female threads on the shaft and the interchangeable attachment prevent relative longitudinal pull-out motion between the engaged shaft of the connector member and interchangeable attachment while allowing relative rotational motion for disengagement of the interchangeable attachment from the shaft of the connector member.

In another aspect of the present invention, the interchangeable attachment connector system is further characterized in that the connector member further comprises a base or stopper, wherein said base or stopper is attached to the distal end of the shaft.

In another aspect of the present invention, the interchangeable attachment connector system is further characterized in that the base or stopper comprises one or more of a vibrator, a ring, a handle, a chain, a suction cup, a double-penetration device, an exercise ball, an exercise peanut, a mechanical device, a harness, a furniture, a ball, a strap or clamp device, a pillow or any combination thereof.

In another aspect of the present invention, the interchangeable attachment connector system is further characterized in that the interchangeable attachment connector system further comprises (c) an accessory unit capable of being securely positioned between the entry opening of the interchangeable attachment and the base or stopper of the connector member when the interchangeable attachment is engaged to the shaft, wherein said accessory unit comprises a body defining first and second axial ends, and a bore extending therethrough, and wherein the shaft is capable of fitting through the bore of the accessory unit.

In another aspect of the present invention, the interchangeable attachment connector system is further characterized in that one or more elements are attached to the body of the accessory unit, wherein said elements include a dildo, an external stimulation device, a vibrator, at least one housing adapted for receiving one or more vibrators, a shaft, a shield, a ring, a handle, or any combination thereof.

In another aspect of the present invention, the interchangeable attachment connector system is further characterized in that at least one of the female threads or the male threads is made of a resilient material.

In another aspect of the present invention, the interchangeable attachment connector system is further characterized in that either the female threads are more resilient than the male threads or the male threads are more resilient than the female threads.

In another aspect of the present invention, the interchangeable attachment connector system is further characterized in that the interchangeable attachment comprises an integral unit made of a resilient material and the female threads are cast on the internal walls of the interchangeable attachment.

In another aspect of the present invention, the interchangeable attachment connector system is further characterized in that said resilient material is a silicone-based material.

In another aspect of the present invention, the interchangeable attachment connector system is further characterized in that the connector member comprises two or more shafts.

In another aspect of the present invention, the interchangeable attachment connector system is further characterized in that the connector member comprises two shafts attached at their distal ends, wherein the two shafts form an angle of 180° or less.

In another aspect of the present invention, the interchangeable attachment connector system is further characterized in that the connector member comprises two shafts attached at their distal ends, wherein the two shafts form an angle of 90° or less.

In another aspect of the present invention, the interchangeable attachment connector system is further characterized in that each thread of said female threads and said male threads comprises a flat shoulder and a tapered wall.

In another aspect of the present invention, the interchangeable attachment connector system is further characterized in that the body of the interchangeable attachment includes two entry openings, wherein each entry opening is located at the axial ends of the body and the bore extends from one entry opening to the other, said bore including a first portion and a second portion, said first portion being threaded in one direction with female threads and said second portion being threaded in the opposite direction from the first portion with female threads.

In another aspect of the present invention, the interchangeable attachment connector system is further characterized in that the shaft includes an upper and a lower shank portions, said upper shank portion being threaded in one direction with male threads and said lower shank portion being threaded in the opposite direction from the upper shank portion with male threads.

In another aspect of the present invention, the interchangeable attachment connector system is further characterized in that the interchangeable attachment is a sexual aid device.

In a further aspect, the present invention provides for an interchangeable sexual aid system, characterized in that said system comprises: (a) a connector member, wherein the connector member comprises a shaft, said shaft having an engagement end and a distal end, and wherein at least a portion of the shaft includes male threads; and (b) an interchangeable sexual aid device capable of being removably engaged to the shaft of the connector member, the interchangeable sexual aid device comprising a body, wherein said body includes two axial ends, an entry opening located in one of said axial ends and an axial bore extending from the entry opening, wherein said bore includes internal walls having female threads complementary to the male threads on the shaft of the connector member, wherein the shaft of the connector member and the interchangeable sexual aid device can be pushed together for engagement by inserting the engagement end of the shaft through the entry opening, and wherein engagement between the male threads and the female threads on the shaft and the interchangeable sexual aid device prevent relative longitudinal pull-out motion between the engaged shaft and interchangeable sexual aid device while allowing relative rotational motion for disengagement of the interchangeable sexual aid device from the connector member.

In another aspect of the present invention, the interchangeable sexual aid system is further characterized in that the connector member further comprises a base or stopper, wherein said base or stopper is connected to the distal end of the shaft.

In another aspect of the present invention, the interchangeable sexual aid system is further characterized in that the base or stopper comprises one or more of a vibrator, a ring, a handle, a chain, a suction cup, a double-penetration device, an exercise ball, an exercise peanut, a mechanical device, a harness, a furniture, a ball, a strap or clamp device, a pillow or any combination thereof.

In another aspect of the present invention, the interchangeable sexual aid system is further characterized in that the sexual device further comprises (c) an accessory unit capable of being securely positioned between the entry opening of the interchangeable sexual aid device and the base or stopper when the interchangeable sexual aid device is engaged to the shaft, wherein said accessory unit comprises a body defining first and second axial ends, and a bore extending therethrough, and wherein the shaft is capable of fitting the bore of the accessory unit.

In another aspect of the present invention, the interchangeable sexual aid system is further characterized in that one or more elements are attached to the body of the accessory unit, wherein said elements include a dildo, an external stimulation device, a vibrator, at least one housing adapted for receiving one or more vibrators, a shaft, a shield, a ring, a handle, or any combination thereof.

In another aspect of the present invention, the interchangeable sexual aid system is further characterized in that at least one of the female threads or the male threads is made of a resilient material.

In another aspect of the present invention, the interchangeable sexual aid system is further characterized in that either the female threads are more resilient than the male threads or the male threads are more resilient than the female threads.

In another aspect of the present invention, the interchangeable sexual aid system is further characterized in that the interchangeable attachment comprises an integral unit made of a resilient material and the female threads are cast on the internal walls of the interchangeable attachment.

In another aspect of the present invention, the interchangeable sexual aid system is further characterized in that said resilient material is a silicone-based material.

In another aspect of the present invention, the interchangeable sexual aid system is further characterized in that the connector member comprises two or more shafts.

In another aspect of the present invention, the interchangeable sexual aid system is further characterized in that the connector member comprises two shafts attached at their distal ends, wherein the two shafts form an angle of less than 180°.

In another aspect of the present invention, the interchangeable sexual aid system is further characterized in that the connector member comprises two shafts attached at their distal ends, wherein the two shafts form an angle of less than 90°.

In another aspect of the present invention, the interchangeable sexual aid system is further characterized in that each thread of said female threads and male threads comprises a flat shoulder and a tapered wall.

In another aspect of the present invention, the interchangeable sexual aid system is further characterized in that the body of the interchangeable sexual aid device includes two entry openings, wherein each entry opening is located at the axial ends of the body and the bore extends from one entry opening to the other, said bore including a first portion and a second portion, said first portion being threaded in one direction with female threads and said second portion being threaded in the opposite direction from the first portion with female threads.

In another aspect of the present invention, the interchangeable sexual aid system is further characterized in that the shaft includes an upper and lower shank portions, said upper shank portion being threaded in one direction with male threads and said lower shank portion being threaded in the opposite direction from the upper shank portion with male threads.

In a further aspect, the present invention provides for an interchangeable attachment characterized in that said interchangeable attachment comprises an integral body made of a resilient material, wherein said integral body includes two axial ends, an entry opening located in one of said two axial ends and an axial bore extending from the entry opening, wherein said bore includes internal walls, the internal walls having female threads cast on the internal walls.

In another aspect of the present invention, the interchangeable attachment is further characterized in that each thread of said female threads comprises a flat shoulder on the side of the entry opening and a tapered wall on the side opposite to the entry opening.

In another aspect of the present invention, the interchangeable attachment is further characterized in that the integral body of the interchangeable attachment includes two entry openings, wherein each entry opening located at the axial ends of the body and the bore extends from one entry opening to the other, said bore including a first portion and a second portion, said first portion being threaded in one direction with female threads and said second portion being threaded in the opposite direction from the first portion with female threads.

In another aspect of the present invention, the interchangeable attachment is further characterized in that said resilient material is a silicon-based material In another aspect of the present invention, the interchangeable attachment is further characterized in that said interchangeable attachment is an interchangeable sexual aid device.

In a further aspect yet, the present invention provides for a connector member useful for engaging an interchangeable attachment, characterized in the connector member comprises a shaft, said shaft having an engagement end and a distal end, and wherein at least a portion of the shaft includes male threads; and wherein the interchangeable attachment comprises a body, wherein said body includes two axial ends, an entry opening located in one of said axial ends and an axial bore extending from the entry opening, wherein said bore includes internal walls having female threads complementary to the male threads on the shaft of the connector member, wherein the shaft of the connector member and the interchangeable attachment can be pushed together for engagement by inserting the engagement end of the shaft through the entry opening, and wherein engagement between the male threads and the female threads on the shaft and the interchangeable sexual aid attachment prevent relative longitudinal pull-out motion between the engaged shaft and interchangeable sexual aid attachment while allowing relative rotational motion for disengagement of the interchangeable sexual aid attachment from the connector member.

In another aspect of the present invention, the connector member is further characterized in that the connector member further comprises a base or stopper, wherein said base or stopper is attached to the distal end of the shaft.

In another aspect of the present invention, the connector member is further characterized in that the base or stopper comprises one or more of a vibrator, a ring, a handle, a chain, a suction cup, a double-penetration device, an exercise ball, an exercise peanut, a mechanical device, a harness, or any combination thereof.

In another aspect of the present invention, the connector member is further characterized in that the female threads are made of a resilient material and the male threads are made of a rigid material.

In another aspect of the present invention, the connector member is further characterized in that the male threads are made of a resilient material and the female threads are made of a rigid material.

In another aspect of the present invention, the connector member is further characterized in that the interchangeable attachment comprises an integral unit made of a resilient material and the female threads are cast on the internal walls of the interchangeable attachment.

In another aspect of the present invention, the connector member is further characterized in that the connector member comprises two or more shafts.

In another aspect of the present invention, the connector member is further characterized in that the connector member comprises two shafts, wherein the two shafts form an angle of 180° or less.

In another aspect of the present invention, the connector member is further characterized in that the connector member comprises two shafts, wherein the two shafts form an angle of 90° or less.

In another aspect of the present invention, the connector member is further characterized in that each thread of said female threads and said male threads comprises a flat shoulder and a tapered wall.

In another aspect of the present invention, the connector member is further characterized in that the bore of the interchangeable attachment includes two entry openings located at opposite ends of the body, said bore including a first portion and a second portion, said first portion being threaded in one direction with female threads and said second portion being threaded in the opposite direction from the first portion with female threads.

In another aspect of the present invention, the connector member is further characterized in that the shaft includes an upper and a lower shank portions, said upper shank portion being threaded in one direction with male threads and said lower shank portion being threaded in the opposite direction from the upper shank portion with male threads.

In another aspect of the present invention, the connector member is further characterized in that said resilient material is a silicone-based material.

In another aspect of the present invention, the connector member is further characterized in that the interchangeable attachment is a sexual aid device.

An advantage of the present invention is providing a device for interchanging interchangeable attachments in which the interchangeable attachment can be pushed onto the connector with a decreased force requirement, while the force required for pulling the interchangeable attachment off the shaft remains high.

Another advantage of the present invention is providing a device for interchanging interchangeable attachments with a reduced incidence of interchangeable attachments slipping out during use.

Other features and advantages of the invention will become apparent to those skilled in the art upon review of the following detailed description, claims and drawings in which like numerals are used to designate like features.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
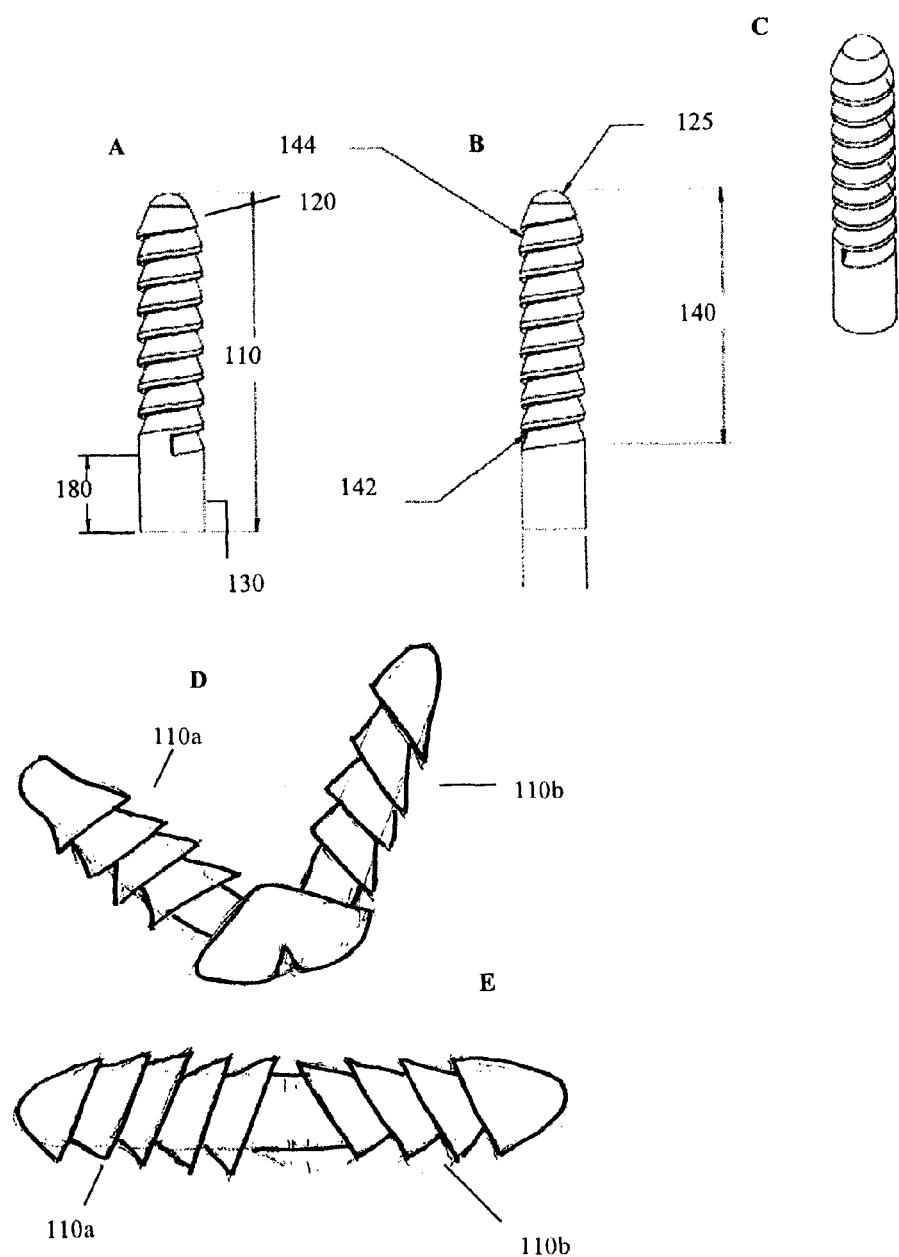
FIG. 1: A illustrates a side view of the connector in accordance to one aspect of the present invention; B illustrates a side view of the connector in accordance to one aspect of the present invention; C illustrates a perspective side view of the connector of the present invention; D illustrates a connector comprising two shafts in accordance to one aspect of the present invention; and F illustrates a connector comprising two shafts in accordance to one aspect of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The invention will be explained in details by referring to the figures.

In this document, the terms "comprise," "comprising," "include" and "including" are used in the inclusive, open sense, meaning that additional elements may be included.

In one aspect of the present invention, the product of the invention comprises two parts:
a connector member; and a series of attachments, which are removably attachable to the connector member.

Figure 4:
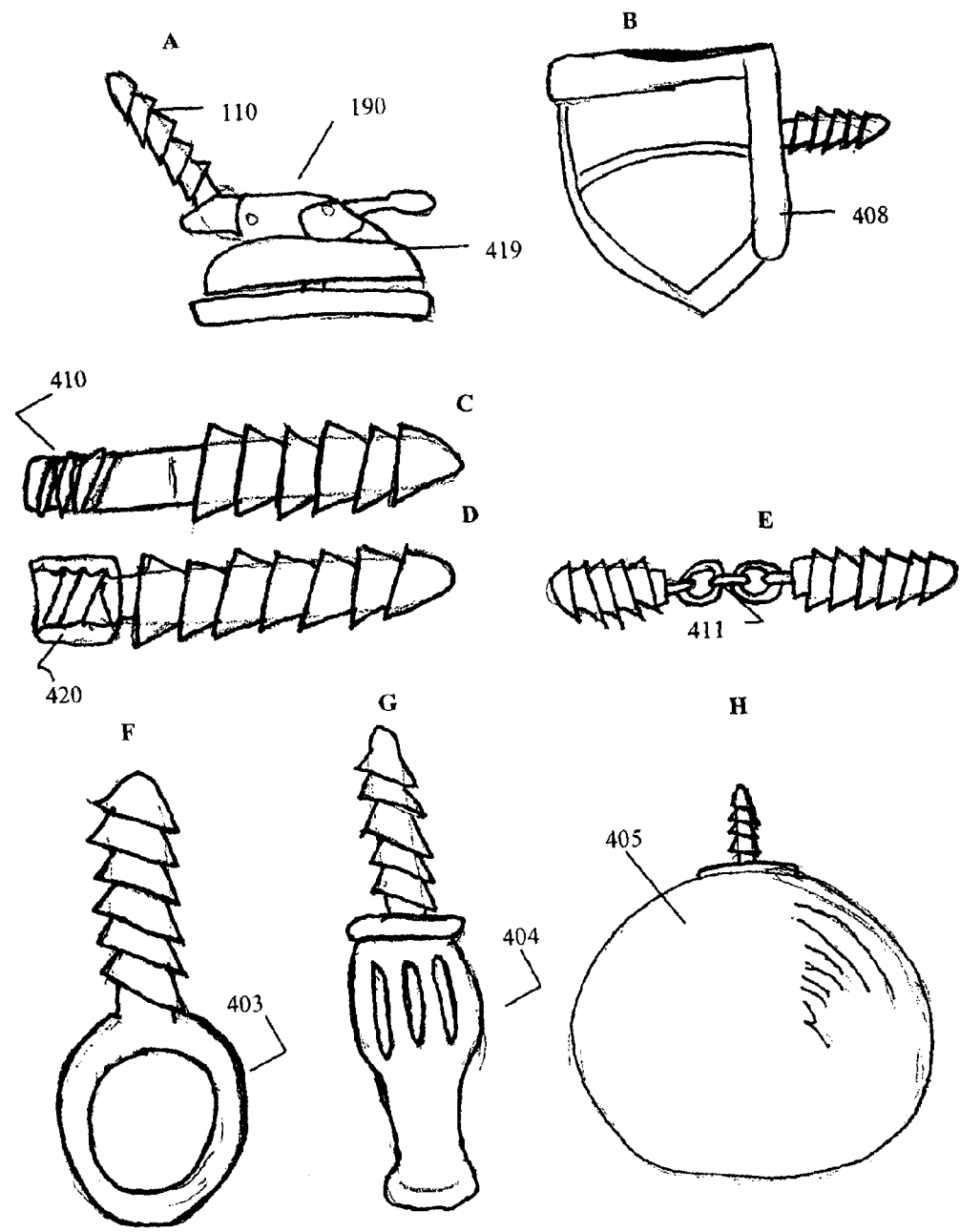
FIG. 4 illustrates a number of different elements that can be used as stoppers or bases on the connector member: A suction cups; B harness; C male threads; D female threads; E chains; F rings; G vibrators; and H exercise balls.
Figure 5:
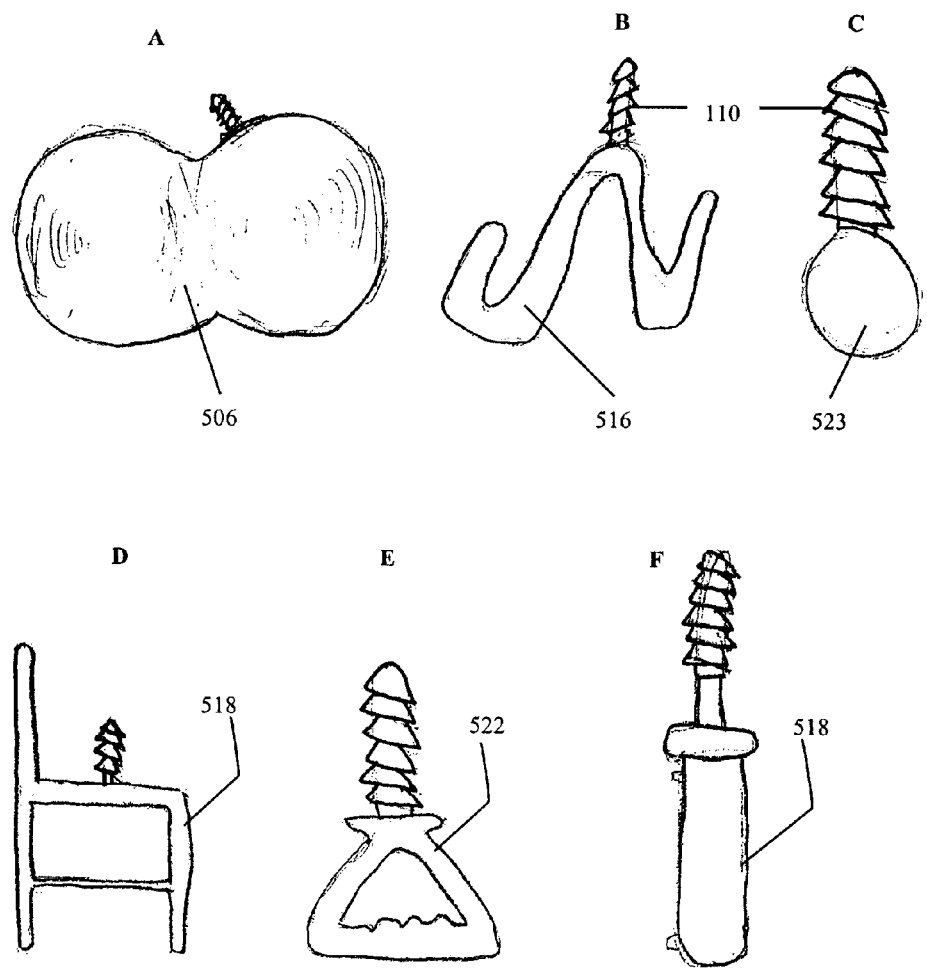
FIG. 5 illustrates a number of different elements that can be used as stoppers or bases on the connector member: A exercise peanut; B exercise device; C ball; D furniture; E handle; and F pneumatic or hydraulic cylinder.

Referring to FIG. 1, the connector member 100 of the invention is shown. The connector 100 comprises one or more shafts 110, each shaft 110 having an engagement end 120 and a distal end 130, wherein at least a portion of the shaft includes male threads 140. The shaft 110 may also comprise a stem portion 180 at the distal end 130. In aspects of the invention, the stem portion 180 may include a second set of male threads 410 for attaching other devices such as a broom handle (see FIG. 4, panel C) or a set of female threads 420 (see FIG. 4, panel D). With reference to FIG. 4, the connector member 100 may also comprise a stopper or a base 190 attached to the distal end 130. With reference to FIGS. 4 and 5, a wide variety of items may be used as the stopper or base 190, including, without limitation, a ring 403, a vibrator 404, an exercise ball 405, a harness 408, a chain 411, a suction cup 419, a double-penetration device, an exercise peanut 506, an exercise device 516, a mechanical device 517 such as a pneumatic cylinder or an hydraulic cylinder, a furniture 518 (for example a seat), a handle 522, such as a Thigh Master™, a ball 523 such as an eight ball, a strap or clamp device, a pillow or any combination thereof. The shaft 110 may also include a rounded tip 125 for easier entry into the interchangeable attachment 200.

With reference to FIG. 1, panels D and E, in one aspect of the invention, the connector member 100 may comprise two shafts 110a, 110b connected at their distal ends 130, wherein the two shafts form an angle of 180° or less (FIG. 1, panel E). In aspects of the invention the two shafts 110a, 110b form an angle of 90° or less (FIG. 1, panel D). The two shafts 110a, 110b forming an angle, such as a "V" shape, serve to couple up to two interchangeable attachments 200.

In another aspect of the present invention, the shaft 110 may include an upper and lower shank portions, said upper shank portion being threaded in one direction with male threads and said lower shank portion being threaded in the opposite direction from the upper shank portion with male threads. This design allows for the attachment of more than one interchangeable attachment 200 to each end of the shaft 110.

Figure 2:
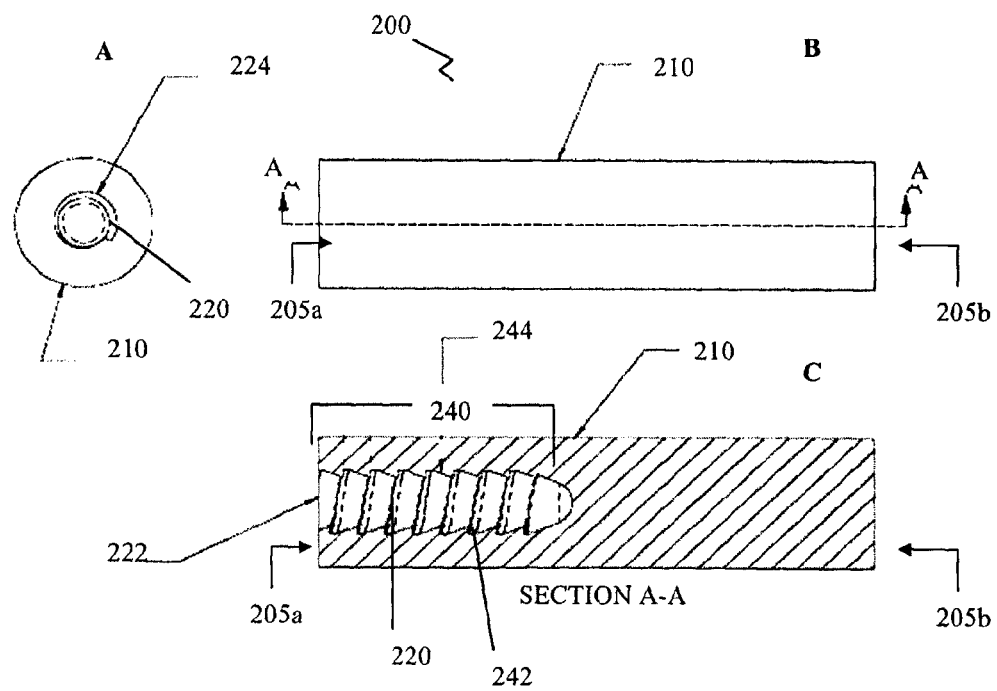
FIG. 2: A illustrates the top view of the entry opening of the interchangeable attachment in accordance to one aspect of the invention; B illustrates a side view of the interchangeable attachment in accordance to one aspect of the invention; and C illustrates the side cross-section of the interchangeable attachment in accordance to one aspect of the invention along line A-A.

Referring to FIG. 2, the interchangeable attachment 200 of the invention is shown. The interchangeable attachment 200 comprises a body 210 that includes two axial ends 205a, 205b, an entry opening 222 located in one of said axial ends, and an axial bore 220 extending from the entry opening 222. The axial bore 220 includes internal walls 224. The internal walls 224 are lined with female threads 240 complementary to the male threads 140 of the shaft 110.

In aspects of the invention, each of said female threads 240 may have a flat shoulder 242 on the side of the opening 222 and a tapered wall 244 on the side of the opposite to the entry opening 222. Likewise, the male threads 140 may have complementary flat shoulders 142 on the side of the distal end 130 and tapered walls on the side of the engagement end 120. This design of the female thread 240 and male threads 140 helps to provide easy entry of the shaft 110 into the bore 220 of the interchangeable attachment 200, while providing resistance to pulling forces between the interchangeable attachment 200 and the connector member 100. The tapers 244 allow the shaft 110 to be inserted under minimal force. The flat shoulders 242 prevent the interchangeable attachment 200 from being pulled out the shaft 110. The shaft 110 and interchangeable attachment 200 may be released by rotational motion (unscrewing). Other female or male thread designs may be used with the proviso that the shaft and interchangeable attachment can be coupled with minimal resistance, while providing high resistance to pulling forces.

In another aspect of the present invention, the body 210 may include two entry openings each located at opposite axial ends 205a and 205b of the body 210, and the bore 220 extends from one entry opening to the other. In this aspect of the invention, the axial bore 220 may include a first portion and a second portion, said first portion being threaded in one direction with female threads 240 and said second portion being threaded in the opposite direction from the first portion with female threads 240. This design allows for the coupling of more than one shaft 110 to the interchangeable attachment 200, or one shaft 110 and other device to the interchangeable attachment 200.

The female 240 and male threads 140 can be altered by size, number and pitch. The female thread 240 can be machined but is preferably cast in a resilient, flexible, rubber-like material. Resilient, rubber-like materials that can be used to manufacture the elements of the present invention include, without limitation, silicone-based materials (polymerized siloxanes) or polyvinyl chloride-based materials. In one embodiment, the interchangeable attachment is an integral unit wherein the female thread 240 is cast on the internal walls 224 of the interchangeable attachment 200. In one embodiment, the female thread 240 is made of a resilient material, while the male thread is made of a more rigid material. This allows the ability of the male threads 140 to skip over the female threads 240 when the two components are being coupled. In another aspect of the invention both the female 240 and male 140 threads can be made of a resilient material, however in this aspect either the male thread 140 or the female thread 240 must be less resilient (more rigid or less flexible) than the other thread. In another aspect, the male thread 140 could be made out of resilient material while the female 240 could be made of a rigid material.

The interchangeable attachment of the invention is formed in a mold. The resilient castable material is poured into a mold having an open end. Immediately after the resilient material is poured, a top plate carrying attached a thread, is inserted into the mould through the open end thereby displacing some of the resilient castable material through the open end of the mold. Some vibration can be used to allow trapped air escape through the open end of the mold so as not to trap air against the tread that is attached to the top plate. This top plate then closes the mold. Room-Temperature Vulcanizing Silicone (RTV) can be used as the resilient material, but other materials may also be used. The RTV will then start to cure. When complete, the mold can be split for easy removal of the final product. Alternatively, the final product (i.e. the interchangeable attachment) can be pulled out of the open end. If the mold is heated, this will increase the speed in which demolding can occur. If the material is degassed prior to being poured into the mold, may prevent the formation of air pockets.

The connector member can be made using traditional molding, such as plastic injection molding. The connector member can also be manually molded using a resilient material mold and a liquid plastic, glass, metal, or ceramic raw materials to create the connector member. The threads on the connector member can also be machined.

Figure 3:
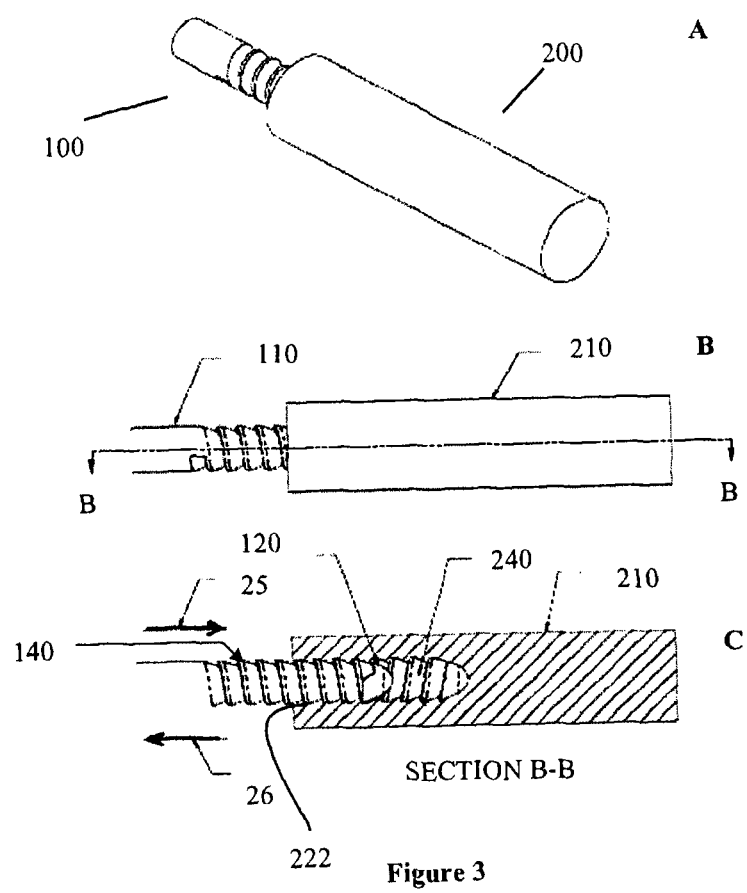
FIG. 3: A illustrates a perspective view of the interchangeable attachment coupled to the connector in accordance to one aspect of the invention; B illustrates a side view of the interchangeable attachment coupled to the connector in accordance to one aspect of the present invention; and C illustrates a side cross-section of the interchangeable attachment coupled to the connector in accordance to one aspect of the invention along line B-B.

Referring to FIG. 3, the interchangeable attachment 200 of the invention is shown coupled to the connector portion 100 of the invention. The connector member 100 and the interchangeable attachment 200 can be pushed together for engagement by inserting the engagement end 120 through the entry opening 222 in the direction of arrow 25. Engagement between the male threads 140 and the female threads 240 on shaft 110 and the interchangeable attachment 200 respectively prevent relative longitudinal pull-out motion between the engaged connector member 100 and interchangeable attachment 200 while allowing relative rotational motion for disengagement of the interchangeable attachment 200 from the connector member 100 in the direction of arrow 26.

The connector member 100 and interchangeable attachment 200 of the present invention allows the flexibility of an almost endless variety of interchangeable attachments 200. For example, the interchangeable attachment may include an endless variety of sexual aid devices.

Figure 6:
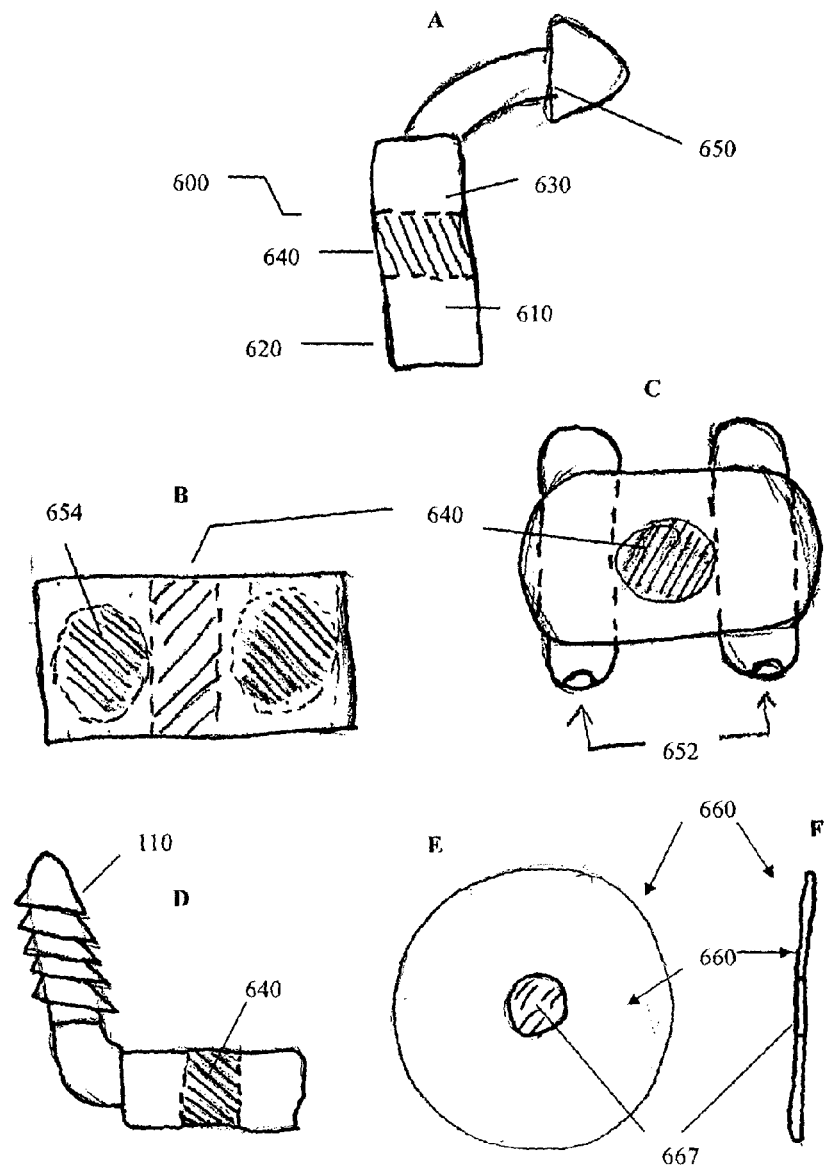
FIG. 6 illustrates accessory units in accordance to aspects of the present invention: A accessory unit with attached external stimulation device; B accessory unit with two housings for vibrators; C accessory unit with two vibrators; D accessory unit with a shaft; E top view of a shield; and F side, cross section view of shield depicted in panel E.

With reference to FIG. 6, the present invention may also be used to sandwich an accessory unit 600 between the entry end 225 of the interchangeable attachment 200 and the base or stopper 190 of the connector 100. The accessory unit 600 capable of being securely positioned between the interchangeable attachments 200 and the base or stopper 190 comprises a body 610 defining first 620 and second 630 axial ends, and a bore 640 extending therethrough, and wherein the shaft 110 of the connector 100 is capable of fitting the bore 640 of the accessory unit 600. More than one accessory units 600 may be sandwiched. One or more of a vast variety of elements can be attached to the accessory unit 600. Non-limiting examples of elements that can be attached to the accessory unit 600 include, without limitation, dildos, external stimulation devices 650, vibrators 652, at least one housing 654 adapted for receiving one or more vibrators, one or more shafts 110, a ring, a handle, or any combination thereof. The accessory unit 600 may also take the form of a shield 660, which comprises a disc 665 having an orifice 667 extending through the disc 665 which can be penetrated by shaft 110. The shield 660 can be made of any rubber-like, resilient material and serves to prevent from excessive penetration.

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto.

I claim:

1. An interchangeable attachment connector system, characterized in that said system comprises: (a) a connector member, said connector comprising a shaft having an engagement end, a distal end and a base attached to the distal end of the shaft, and said shaft having at least a portion threaded with first threads; (b) an interchangeable attachment, the interchangeable attachment comprising a body having an opening located in one end and bore extending from the opening, said bore having second threads complementary to the first threads on the shaft of the connector member, said complementary first and second threads being configured for insertion of the shaft into the bore by pushing the engagement end of the shaft through the opening, and said complementary first and second threads being further configured for preventing relative longitudinal pull-out motion of the inserted shaft while allowing relative rotational motion for disengagement of the shaft from the interchangeable attachment; and (c) one or more accessory units, each accessory unit having a body with an orifice extending through the body, said orifice being configured for receiving the shaft there through such that the once or more accessory units can be positioned between the opening of the interchangeable attachment and the base of the connector member when the connector member is inserted into the interchangeable attachment.

2. The interchangeable attachment connector system of claim 1, characterized in that the base is selected from a stopper, a vibrator, a ring, a handle, a chain, a suction cup, a double-penetration device, an exercise ball, an exercise peanut, a mechanical device, a harness, a furniture, a ball, a strap or clamp device, a pillow or another threaded shaft configured for engagement with the threaded bore of the interchangeable attachment.

3. The interchangeable attachment connector system of claim 1, characterized in that one or more elements are attached to the body of the one or more accessory units.

4. The interchangeable attachment connector system of claim 1, characterized in that at least one of the second threads or the first threads is made of a resilient material.

5. The interchangeable attachment connector system of claim 1, characterized in that the interchangeable attachment comprises an integral unit made of a resilient material and the second threads are cast on internal walls of the interchangeable attachment.

6. The interchangeable attachment connector system of claim 4, characterized in that said resilient material is a silicone-based material or a polyvinyl chloride-based material.

7. The interchangeable attachment connector system of claim 1, characterized in that the connector member comprises two or more shafts, each shaft having an engagement end and a distal end, said two shafts being attached to one another at their distal ends, and wherein at least a portion of said two shafts includes threads complementary to the second threads.

8. The interchangeable attachment connector system of claim 1, characterized in that the connector member comprises two shafts attached at their distal ends, wherein the two shafts form an angle of 180° or less.

9. The interchangeable attachment connector system of claim 1, characterized in that each thread of said first threads comprises a flat shoulder facing the distal end of the shaft and a tapered wall facing the engagement end of the threaded shaft, and wherein each thread of said second threads comprises a flat shoulder facing the opening of the interchangeable attachment and a tapered wall facing opposite to the entry of the interchangeable attachment.

10. The interchangeable attachment connector system of claim 1, characterized in that the shaft includes a first portion being threaded in a first direction and a second portion being threaded in an opposite direction from the first direction.

11. The interchangeable attachment connector system according to claim 1, characterized in that the body of the interchangeable attachment is designed in the form of a sexual aid device.

12. A connector member for receiving an interchangeable sexual aid attachment, characterized in the connector member comprises a shaft, said shaft having an engagement end and a distal end, and said shaft having at least a portion threaded with first threads, the interchangeable sexual aid attachment comprising a body designed in the form of a sexual aid, said body including two opposite ends, an opening located in one of said ends, and a bore extending from the entry opening said bore having second threads complementary to the first threads on the shaft of the connector member, said complementary first and second threads being configured for insertion of the shaft into the bore by pushing the engagement end of the shaft through the entry opening, and said complementary first and second threads being further configured for preventing relative longitudinal pull-out motion of the inserted shaft from said bore while allowing relative rotational motion for disengagement of the shaft from the interchangeable sexual aid attachment, the shaft being further capable of receiving one or more accessory units, each of said one or more accessory units having a body with an orifice extending through the body, said orifice being configured for receiving the threaded shaft there through such that the one or more accessory units are positioned between the opening of the interchangeable sexual aid attachment and the distal end of the threaded shaft when the connector member is inserted into the interchangeable sexual aid attachment.

13. The connector member of claim 12, characterized in that the connector member further comprises a base attached to the distal end of the shaft.

14. The connector member of claim 13, characterized in that the base is selected from a stopper, a vibrator, a ring, a handle, a chain, a suction cup, a double-penetration device, an exercise ball, an exercise peanut, a mechanical device, a harness, or another threaded shaft configured for engagement with threaded bore of the interchangeable sexual aid attachment.

15. The connector member of claim 12, characterized in that at least one of the first threads or the second threads are made of a resilient material.

16. The connector member of claim 12, characterized in that the interchangeable sexual aid attachment comprises an integral unit made of a resilient material and the second threads are cast on internal walls of the interchangeable attachment.

17. The connector member of claim 12, characterized in that the connector member comprises two or more shafts, each shaft having an engagement end and a distal end, said two shafts being attached to one another at their distal ends, and wherein at least a portion of said two shafts includes threads complementary to the second threads.

18. The connector member of claim 12, characterized in that the connector member comprises two shafts attached at their distal ends, wherein the two shafts form an angle of 180° or less.

19. The connector member of claim 12, characterized in that each thread of said first threads comprises a flat shoulder facing the distal end of the shaft and a tapered wall facing the engagement end of the threaded shaft, and wherein each thread of said second threads comprises a flat shoulder facing the opening of the interchangeable attachment and a tapered wall facing opposite to the entry of the interchangeable attachment.

20. The connector member of claim 12, characterized in that the shaft includes a first portion being threaded in a first direction and a second portion being threaded in an opposite direction from the first direction.

21. The connector member according to claim 15, characterized in that said resilient material is a silicone-based material or a polyvinyl chloride-based material.

22. The interchangeable attachment connector system of claim 3, characterized in that said one or more elements are sexual devices selected from a dildo, an external stimulation device, a vibrator, at least one housing adapted for receiving one or more vibrators, one or more threaded shafts configured for engagement with the threaded bore of the interchangeable attachment, a shield, a ring, a handle, or any combination thereof.

23. The interchangeable attachment connector system of claim 11 characterized in that said sexual device is selected from a dildo, an external stimulation device and a vibrator.

24. The connector member of claim 12, characterized in that one or more sexual devices are attached to the body of said one or more accessory units.

25. The connector member of claim 24, characterized in that the one or more sexual devices are selected from a dildo, an external stimulation device, a vibrator, at least one housing adapted for receiving one or more vibrators, one or more threaded shaft configured for engagement with the threaded bore of the interchangeable attachment, a shield, a ring, a handle, or any combinations thereof.

26. The connector member of claim 12 characterized in that said interchangeable sexual aid attachment is selected from a dildo, an external stimulation device and a vibrator.

27. The interchangeable attachment connector system of claim 5, characterized in that said resilient material is a silicone-based material or a polyvinyl chloride-based material.

28. The connector member according to claim 16, characterized in that said resilient material is a silicon-based material or polyvinyl chloride-based material.

* * * * *